United States Patent [19]
Wexler et al.

[11] 3,956,449
[45] May 11, 1976

[54] FLAT PLATE DIALYZER AND METHOD OF MAKING SAME

[76] Inventors: Melvin Wexler, 3207 Hayes Road, Norristown, Pa. 19403; John J. Vey, 909 Limekiln Pike, Maple Glen, Pa. 19002

[22] Filed: Mar. 18, 1975

[21] Appl. No.: 559,413

[52] U.S. Cl. .......................... 264/139; 210/321 A; 264/271
[51] Int. Cl.² .................................. B01D 31/00
[58] Field of Search .............. 210/22, 321; 264/257, 264/229, 258, 134, 271; 156/296

[56] References Cited
UNITED STATES PATENTS

| | | | |
|---|---|---|---|
| 3,266,629 | 8/1966 | Megibow | 210/321 |
| 3,565,258 | 2/1971 | Lavender et al. | 210/321 |

*Primary Examiner*—Frank A. Spear, Jr.
*Attorney, Agent, or Firm*—Connolly and Hutz

[57] ABSTRACT

A flat plate dialyzer and method of making same is disclosed. The method includes the steps of stacking alternate layers of permeable membrane tubing and support material in a curved stacked array, applying a flexible sealing material to the ends of the curved array, cutting off a portion of this sealing material and rotating the curved array toward a flat plane which opens up the permeable tubing to provide a path for blood flow therethrough. Dialysate flows through and around the support material on the outside of the tubing. A casing surrounds the array and contains inlet and outlet ports for blood and dialysate. The sealing material may be applied to the ends of the array in the form of a flange which acts as a compression seal between mating portions of the casing. This method and apparatus results in an improved inexpensive pumpless dialyzer with simple entrance and exit ports for the flow of fluids therethrough.

5 Claims, 5 Drawing Figures

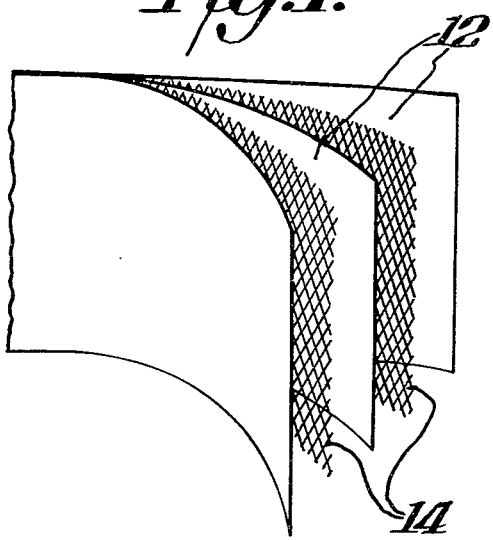
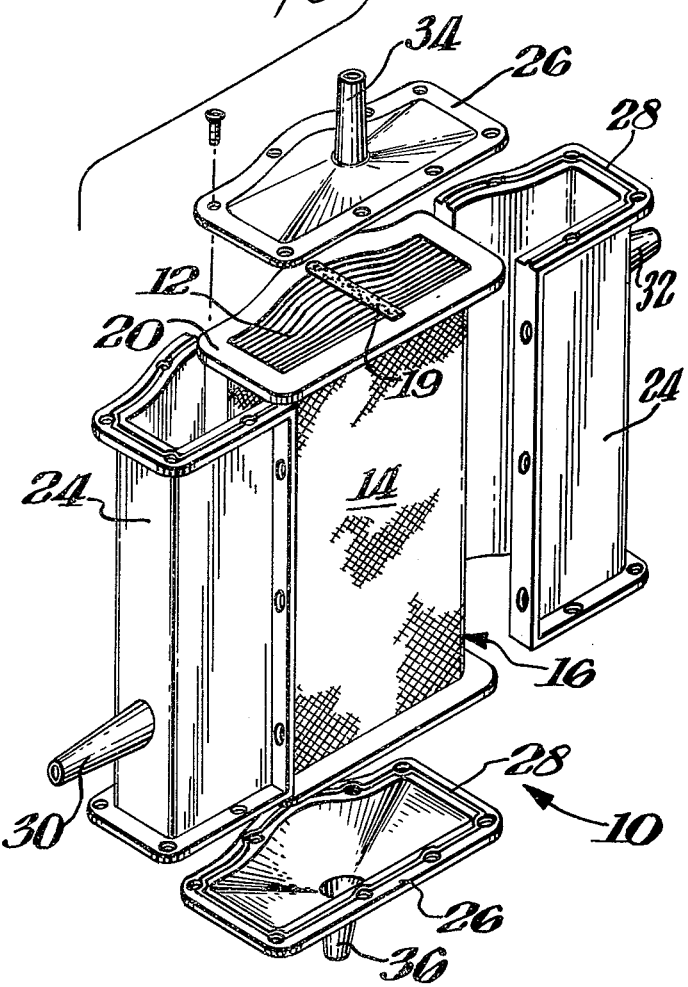
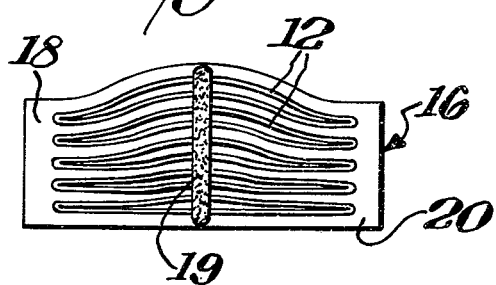
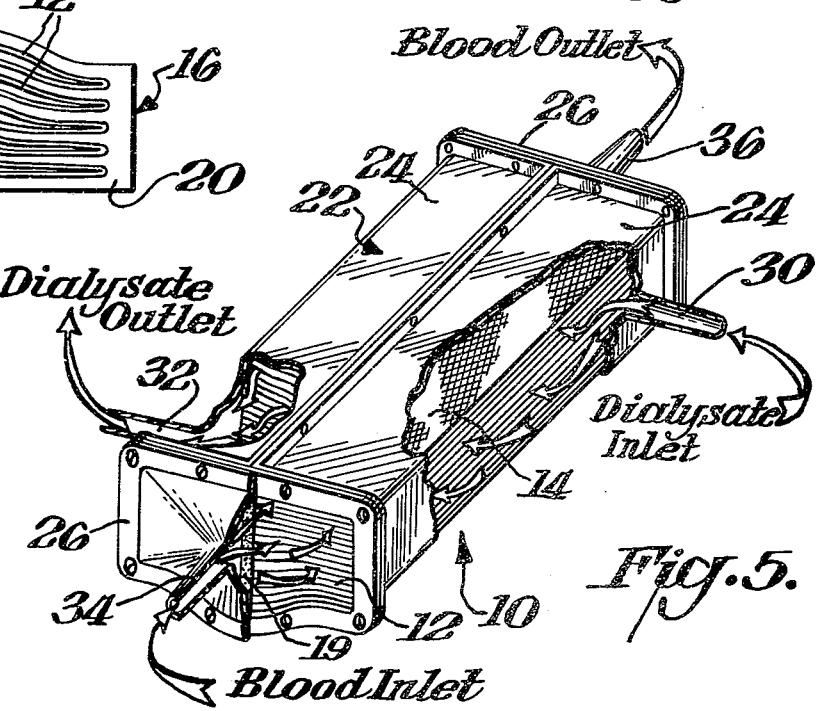

FLAT PLATE DIALYZER AND METHOD OF MAKING SAME

BACKGROUND OF THE INVENTION

This invention relates to a flat plate dialyzer and method of making same and more particularly to a compact hemodialysis unit having a small volumetric capacity and minimum pressure resistance to blood flow therethrough which can be used without the need for blood transfusion and/or blood pumps.

A common type of hemodialysis unit consists of tightly wound coil of permeable membrane tubing submerged in dialysate. Since the tubing is long and tightly wound, considerable back pressure is developed within the unit and a blood pump is required to force blood through the tubing. In addition, the blood inventory in the coiled tubing is substantial and a transfusion often is required when the machine is used. Since only a small part of the transfused blood which is used to prime a coil can be recovered, this represents added expense and inconvenience to a person undergoing hemodialysis. In light of these problems with dialyzer coils, flat plate dialyzers have become popular for use in treatment of kidney diseases.

Many flat plate dialyzers disclosed in the prior art consist of alternating layers of permeable membrane tubing and support material which are sealed on the ends with an epoxy resin or similar sealing material and installed in a casing. One of the problems in configurations like this, however, is the difficulty in opening up a flow through the permeable membrane tubing, the walls of which tend to stick together during the manufacturing process. Another problem is pulling or peeling of sealing material from the permeable membrane tubing which introduces leakage between the blood and dialysate flow paths.

One approach to the problem of opening up membrane tubing in a flat plate dialyzer is illustrated in Lavender et al U.S. Pat. No. 3,522,885 issued Aug. 4, 1970. This patent discloses inserts placed within the membrane tubing during manufacture which are removed after manufacture is completed. The use of such inserts, however, has many obvious drawbacks such as the extra labor needed to insert and remove the inserts as well as the increased possiblity of tearing or otherwise penetrating the delicate membrane tubing. Another approach to the problem of keeping the tubing open after manufacture is illustated in Lavender U.S. Pat. No. 3,565,258 which discloses support material such as non-woven mesh inserted in the tubes. However, this has the same drawbacks as the approach in the U.S. Pat. No. 3,522,885 to Lavender, i.e. tearing of the tube and cost of labor needed to insert the mesh in the tube. The Lavender U.S. Pat. No. 3,565,258 also has the disadvantage of requiring very careful application of sealing material between each layer of tubing which can substantially increase the cost of the device.

SUMMARY OF THE INVENTION

This invention obviates the difficulties with prior art dialyzers described above and provides an attractive low cost method for producing an efficient flat plate dialyzer. More particularly, this application discloses the simple but unobvious method of stacking alternate layers of tubular permeable membranes and support material to form a curved stacked array, applying sealing material such as a flexible resin to the ends of the curved array and then rotating the array towards a flat plane. The latter step opens the membrane tubing since each subsequent layer of tubing is longer by a constant length approaching the support means thickness.

The sealing material may be extended beyond the perimeter of the array in the form of flanges at each end of array. This flange can be used to seal the array within a surrounding casing without any additional sealing steps normally called for by the prior art.

The particular sealing materials developed for use in conjunction with this process are flexible enough to allow for the rotation of the array after application of the sealing material yet will adhere tenaciously to the permeable membrane tubing.

BRIEF DESCRIPTION OF THE DRAWINGS

FIG. 1 is a pictorial view of a portion of the permeable tubing and support material making up the stacked array;

FIG. 2 is an end view of the stacked array illustrating the curved configuration thereof after application of sealing material to the ends thereof;

FIG. 3 is an end view of the stacked array illustrating the opened permeable tubing after rotation of the array toward a flat plane;

FIG. 4 is an exploded pictorial view of the flat plate dialyzer assembly; and

FIG. 5 is a pictorial view of the assembled flat plate dialyzer having portions broken away to illustrate the blood and the dialysate flow therethrough.

DETAILED DESCRIPTION OF THE PREFERRED EMBODIMENT

The flat plate dialyzer 10 of this invention is formed from collapsed permeable membrane tubing 12 and support material 14 which are alternately stacked on top of each other to form a stacked array 16. The collapsed membrane tubing 12 may be formed from material such as Cuprophane PT-150 (a trademark of Enka Glanstaff, West Wuppertal, Germany for regenerated cellulose dialysis tubing). The support material 14 can be any flexible, porous material such as Porex (a trademark of Glassrock Products, Inc., Fairburn, Georgia for open pore thermoplastic sheet), polypropylene netting, reticulated urethane foam or non-woven netting such as disclosed in Miller U.S. Pat. No. 3,508,662. Preferably the support material 14 forms the first and last layers of the stacked array 16.

To form a dialyzer having dialyzing area of one square meter, 19 layers of 40 mil thick, 130 millimeter wide, 14 inch long polypropylene netting and 18 layers of 122 millimeter wide, 14 inch long regenerated cellulose dialysis tubing are stacked, with the open netting forming the first, third, fifth and all odd layers through the 37th layer. This causes the membrane tubing 12 to be sandwiched between layers of the support material 14.

The array 16 is preferably assembled on a curved surface. Alternatively, the stacked array 16 may be assembled flat and then curved and clamped or otherwise held on a curved surface to maintain the curved configuration. While in the curved configuration the ends of the array 16 are sealed using a flexible sealing material 18 such as a potting resin, the formulations of which will be described in more detail below. (FIG. 2) The curved array can be potted in such a way that a resin flange 20 will be present after potting (see FIG. 4). This flange will act as a seal between the respective blood and dialysate flow paths when it is assembled in the casing 22 described below.

After the potting material has cured the extremities of the stacked array 16 are trimmed to insure that the ends of the collapsed membrane tubing 12 will be exposed. The next step in the process is accomplished by holding the ends of the stacked array 16 tightly and rotating the whole array toward a horizontal plane. This rotation causes the collapsed tubing to open up and remain open since each subsequent layer is approximately a support means thickness longer than its predecessor. This step avoids the cumbersome methods used by the prior art to open up the tubing in a flat plate dialyzer. To avoid subsequent collapse of the tubing 12 during handling and shipment a thin strip or dots of sealing material 19 can be placed on the ends of the array to preserve the tubing 12 in its open position (See FIG. 3).

To complete the dialyzer 10 the stacked array 16 with its flange 20 is inserted in casing 22 made up of mating body portions 24 and headers 26. (See FIG. 4). The body of the casing 24 and headers 26 may have a continuous raised bead 28 which assists in maintaining the compressive seal between the headers 26 and body 24 to insure separation of the flow paths through the dialyzer 10.

The flow paths through the dialyzer 10 after assembly of all parts are illustrated in FIG. 5. More particularly, dialysate enters the casing 22 through dialysate inlet 30 and flows around and over the membrane tubing in the area occupied by the support material 14 and finally exits through dialysate outlet 32. The blood enters casing 22 at blood inlet 34 and flows within the permeable tubing 12 and leaves the casing through blood outlet 36. The blood flow can be either countercurrent to dialysate flow as illustrated or cocurrent.

The flexible sealing material 18 used in conjunction with this invention must exhibit various unique properties. Namely, it must be capable of adhering tenaciously to both wet and dry permeable membrane tubing 12 and must be flexible so that it will not crack or peel off that tubing 12 when the array 16 is rotated from a curved toward a flat configuration.

These objectives have been met when the sealing material 18 comprises a mixture of resinous condensation products of bisphenol A and epichlorohydrin resin with at least one polypropylene glycol terminated with amono groups. A specific formulation of this type is as follows.

| Parts By Weight | Description of Components |
| --- | --- |
| 10 | EPON 828 resin, a proprietary product of Miller Stephenson Co., which is a resinous condensation product of bisphenol A and epichlorohydrin. |
| 0-5 | JEFFAMINE D-400, a proprietary product of Jefferson Chemical Co. of Houston, Texas which is a polypropylene glycol terminated with amino groups having an approximate molecular weight of 400. |
| 5-10 | JEFFAMINE D-2000, a proprietary product of Jefferson Chemical Co., of Houston, Texas, which is a polypropylene glycol terminated with amino groups having an approximate molecular weight of 2000. |

If desired, a small amount of an accelerator, for example, 0.5 parts by weight of Jeffamine A-298, a proprietary product of Jefferson Chemical Co. of Houston, Tex., may be added to the above formulation to minimize the curing time.

We claim:
1. A method of making a flat plate dialyzer comprising the steps of aligning lengths of tubular membrane material and support material in a curved stacked array, applying sealing material to the ends of the curved array, removing at least a portion of the sealing material, and rotating the edges of the curved array toward a level plane to open up the tubular membrane material.

2. The method of claim 1, wherein the support material comprises the first and last layers of the stacked array.

3. The method of claim 1, wherein the sealing material is flexible and adheres to the membrane material.

4. The method of claim 3, wherein the flexible sealing material is a mixture of resinous condensation products of bisphenol A and epichlorohydrin resin with at least one polypropylene glycol terminated with amino groups.

5. The method of claim 1, wherein sealing material is applied to a limited portion of the ends of the stacked array after rotation of the array toward a flat plane to retain the tubular membrane material in an open position.

* * * * *